T. F. MOORE.
CARRIAGE-SPRING.

No. 174,278.  Patented Feb. 29, 1876.

WITNESSES
Villette Anderson.
Emory H. Bates.

INVENTOR
Theo. F. C. Moore.
Gilmore &c.
ATTORNEYS.

ABRAM B. ELSTON.

UNITED STATES PATENT OFFICE.

THEODORE F. MOORE, OF OWEGO, NEW YORK.

IMPROVEMENT IN CARRIAGE-SPRINGS.

Specification forming part of Letters Patent No. 174,278, dated February 29, 1876; application filed January 8, 1876.

*To all whom it may concern:*

Be it known that I, THEODORE F. MOORE, of Owego, in the county of Tioga and State of New York, have invented a new and valuable Improvement in Carriage-Springs; and I do hereby declare that the following is a full, clear, and exact description of the construction and operation of the same, reference being had to the annexed drawings, making a part of this specification, and to the letters and figures of reference marked thereon.

Figure 1:
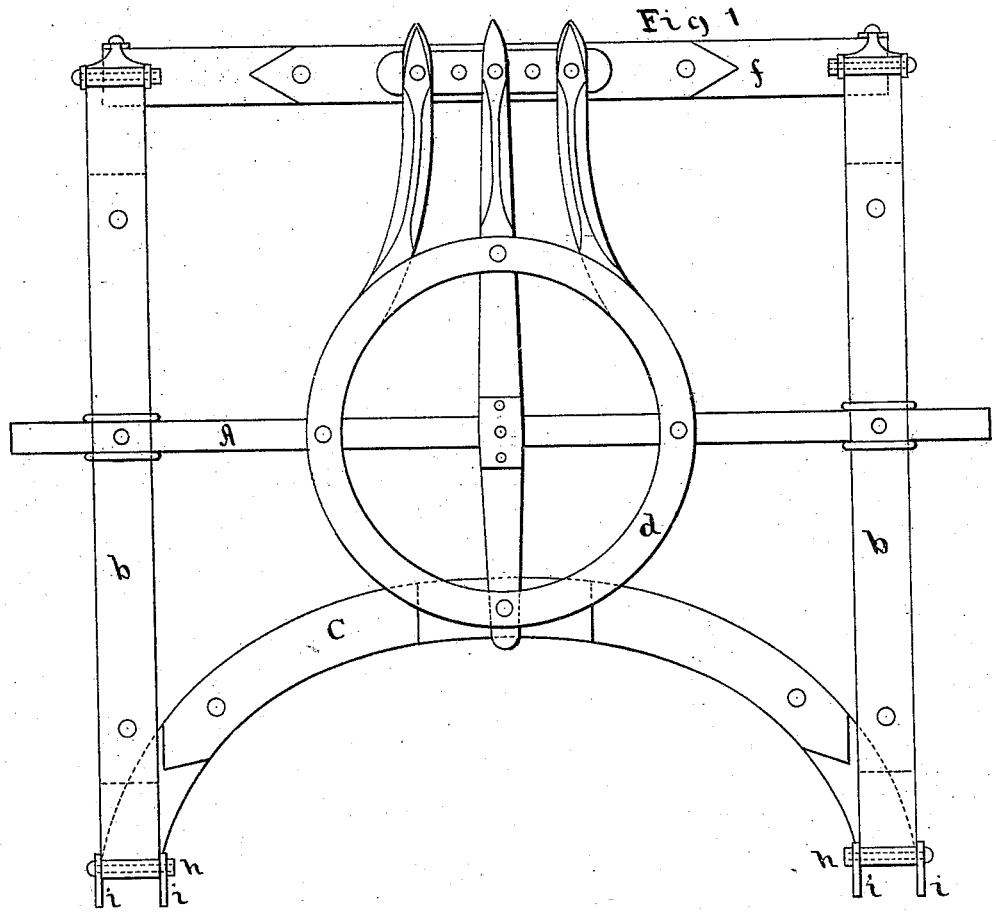
Figure 2:
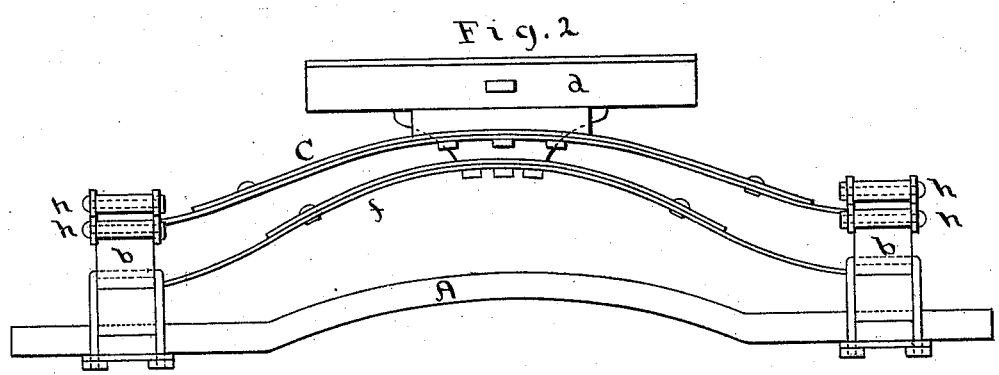

Figure 1 of the drawings is a representation of a plan view of my carriage-spring, and Fig. 2 is a side view thereof.

My invention relates to an improvement in springs for vehicles of all descriptions, whereby the length of body may be lessened, an easy, durable spring obtained, and much of the wood-work ordinarily employed in connection with springs dispensed with. To this end, it consists in a peculiarly-shaped double-curved or compound spring, adapted to be used in connection with side springs, and located at either the front or rear or both ends of a vehicle, and also in the construction of clips at the ends of said curved spring for connecting purposes, all as hereinafter set forth and claimed.

Referring to the drawings, A represents the axle, having secured thereto, in any suitable manner, the springs $b\ b$. C is the double curved or compound spring, which, as shown in Fig. 1, curves or bends backward, and which also bends upward, as shown in Fig. 2.

It will be seen that this compound spring comes under the support $d$ for the fifth-wheel, to which it is secured, whereby the straight wood-work which would be employed in connection with ordinary springs is dispensed with, and the curved wood-work used, as shown. The side springs $b\ b$ connect this spring with a spring, $f$, which, if preferred, may be of ordinary construction, as shown in the drawings. The connecting devices consist of two parallel pins, $h\ h$, secured in side plates or clips $i\ i$, adapted to receive such, and also to connect with the "hounds" of a carriage-pole. The pins constitute bearings for the ends of springs C and $b\ b$, the latter-mentioned springs in this instance connecting with the upper pins, and the spring C with the lower.

My improvement may be applied to double carriages, business-wagons, and, in fact, to all descriptions of vehicles.

What I claim as new, and desire to secure by Letters Patent, is—

1. The double curved or compound spring C, constructed substantially as described, and applied to the front or rear running-gear of a vehicle, substantially as and for the purposes set forth.

2. The clips $i\ i$, with parallel pins $h\ h$, in combination with the compound spring C and side springs $b\ b$, substantially as specified.

3. The support $d$ constructed and connected with the compound spring C, substantially as specified.

4. The compound spring C connected with support $d$, and end clips, in combination with springs $b\ b$ and $f$, substantially as and for the purpose set forth.

5. The combination of the double curved spring C, springs $b$ and $f$, and clips $i\ i$, having parallel pins $h\ h$, substantially as described, and for the purpose set forth.

In testimony that I claim the above, I have hereunto subscribed my name in the presence of two witnesses.

THEODORE F. MOORE.

Witnesses:
 CHARLES C. THOMAS,
 ABRAM B. ELSTON.